Jan. 24, 1956  L. P. FRIEDER ET AL  2,732,153
DELAY OPENING PARACHUTE AND PYROLYTIC RELEASE THEREFOR
Filed Dec. 3, 1953
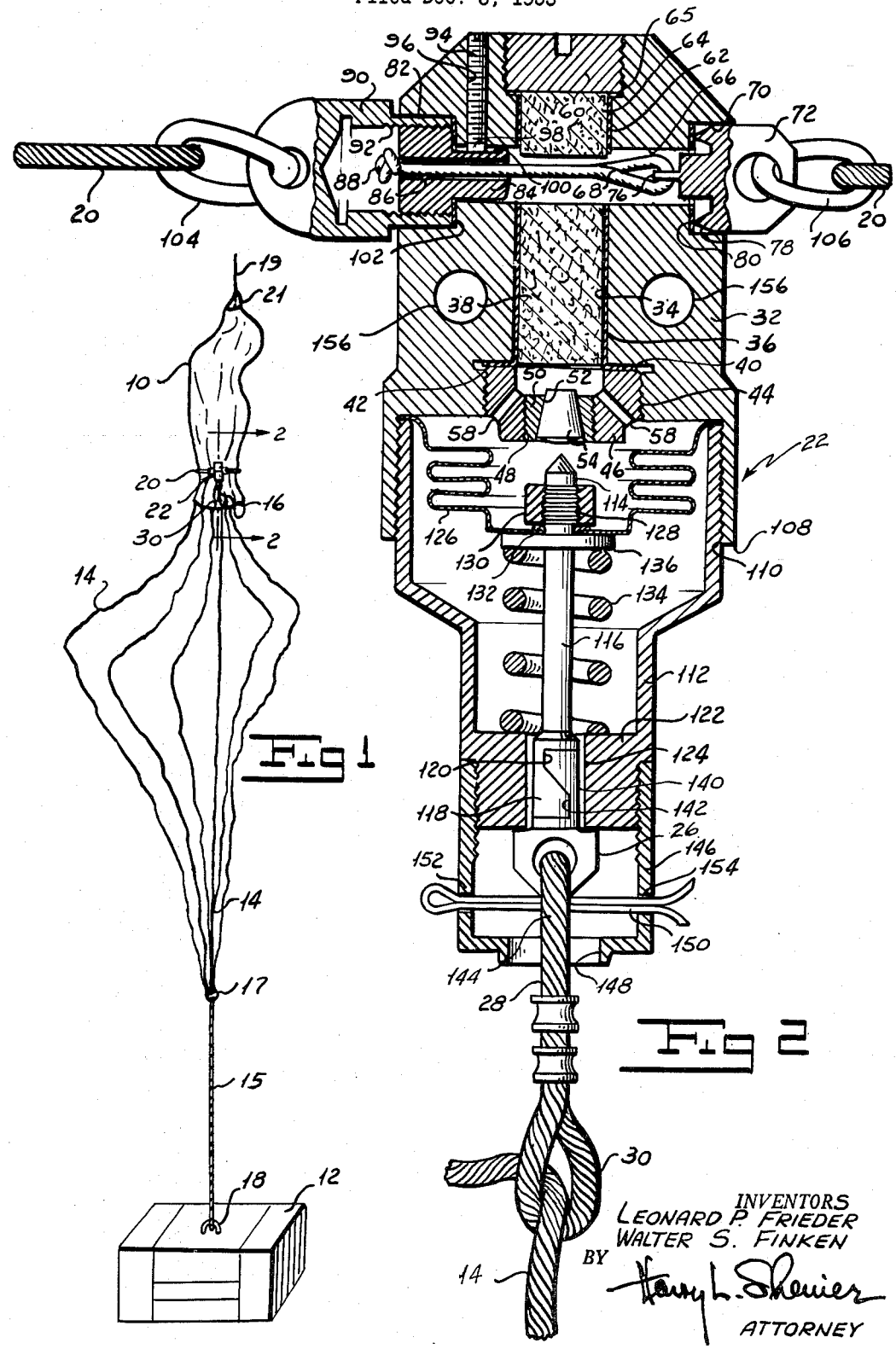
INVENTORS
LEONARD P. FRIEDER
WALTER S. FINKEN
BY
ATTORNEY United States Patent Office 2,732,153
Patented Jan. 24, 1956

2,732,153
DELAY OPENING PARACHUTE AND PYROLYTIC RELEASE THEREFOR

Leonard P. Frieder, Great Neck, and Walter S. Finken, Brooklyn, N. Y.; said Finken assignor to said Frieder Application December 3, 1953, Serial No. 395,878

10 Claims. (Cl. 244—150)

Our invention relates to a delay opening parachute and pyrolytic release therefor and more particularly to an improved pyrolytic release wherein the combustible elements are hermetically sealed from the atmosphere.

In many instances it is desirable that the canopy of a parachute be released only at a predetermined time after the parachute has been dropped from an aircraft. This time delay is necessary in order that the parachute be free of the aircraft and its slip stream before the canopy opens so that the possibility of fouling is minimized. Then too, when a parachute is dropped from modern, high-speed planes, it is initially traveling at the same speed as the aircraft from which it is dropped. If the canopy is permitted to open immediately after release from the plane, the opening shock may be so great as to cause parachute failure. Moreover, if the parachute is carrying delicate instruments for obtaining meteorological information or other data, high opening shock may cause derangement of the instruments.

In order to delay the opening of the parachute canopy until the parachute is clear of the aircraft and its slip stream and the speed of movement of the parachute has been reduced to a point where the opening shock will not be excessive, delay devices have been employed. These delay devices are arranged to release the parachute canopy to permit it to open at a predetermined time after the parachute is free of the aircraft and its slip stream. One example of such a delay device is disclosed in our Patent No. 2,582,113, issued January 8, 1953. The release device disclosed therein employs a fusible link and combustion elements having a predetermined burning rate to release a parachute pack at a predetermined time after it has been dropped from the plane.

It is desirable that the combustion elements of a delay release device be protected from the atmosphere prior to actual use, since moisture in the atmosphere may cause the material making up the combustion elements to deteriorate with the result that the predetermined rate of burning becomes indeterminate. It is also necessary that some means be provided for permitting the expansion of the gases generated during the burning of the combustion elements to expand so that pressure will not be developed within the housing to an extent which would appreciably influence the rate of combustion of the combustible elements. Moreover, our release is provided with means whereby the tension on the fusible link may readily be adjusted. Our release is adapted to release a reefing band enclosing the folds of an extended parachute canopy and is operated by the parachute shroud lines.

One object of our invention is to provide a delay opening parachute and pyrolytic release therefor.

Another object of our invention is to provide a delay opening parachute and pyrolytic release therefor wherein the combustion elements of the release are hermetically sealed from the atmosphere and yet which prevents the development of pressure within the combustion element housing which would affect the rate of combustion of the combustible elements.

A further object of our invention is to provide a delay opening parachute and a pyrolytic release therefor wherein the tension on the fusible link of the release may readily be adjusted.

Yet another object of our invention is to provide a delay opening parachute and pyrolytic release therefor wherein action of the pyrolytic release is initiated by the parachute shroud lines.

A still further object of our invention is to hermetically seal the delay combustible train in a manner to prevent the building up of pressure during combustion to an extent which would increase the rate of combustion.

Other and further objects of our invention will appear from the following description.

In general, our invention contemplates a delay opening parachute provided with a pyrolytic release including a delay cartridge housing and a firing pin assembly housing. Within the cartridge housing we dispose a fusible or combustible link secured between the ends of a reefing band encompassing the folds of the parachute canopy adjacent the hem thereof. We provide a delay powder train cartridge ignited by a primer and an auxiliary charge for aiding in melting the fusible link a predetermined time after the percussion cap is fired.

The firing pin housing is secured at one end to the cartridge housing and contains a releasable firing pin adapted to be actuated by the parachute shroud lines when the parachute is dropped from the plane.

In order to seal hermetically the powder charges making up the combustible elements of the release device prior to actual release of the parachute, we dispose an expansible bellows between the cartridge housing and the firing pin assembly housing. The firing pin extends through a seal provided in the bellows center. The arrangement is such that, upon ignition of the delay powder pellet, the gases of combustion are discharged into the bellows, which expands to prevent the building up of pressure which would accelerate the rate of combustion. Our expansible sealing means, moreover, permits the firing pin to be drawn back against the action of the firing pin spring to cock the spring and then fire the percussion cap. A removable arming pin ensures that the percussion cap will not be accidentally fired prior to actual release of the parachute. We provide adjustable means for securing the fusible or combustible link between the ends of the reefing band.

Our device is provided with a trigger adapted to release the firing pin. A short length of line secured at one end to the trigger has a loop formed in its other end. One of the parachute shroud lines passes through the loop and is snubbed thereby. When the parachute is dropped, the snubbed shroud line is tensioned before the remaining shroud lines and actuates the trigger to release the firing pin. The firing pin is spring driven to fire the primer and ignite the cartridge powder train. The arming pin, of course, has first been withdrawn. The powder train or delay pellet in the cartridge is selected to have a predetermined burning time. After a predetermined time interval the auxiliary charge is ignited. The burning of these charges melts or burns the fusible or combustible link to release the reefing band to allow the parachute canopy to blossom and control the descent of the load.

In the accompanying drawings which form part of the instant specification and which are to be read in conjunction therewith and in which like reference numerals are used to indicate like parts in the various views:

Figure 1 is a perspective view of our delay opening parachute illustrating the action of the release device in use as a parachute disreefer immediately before being fired.

Figure 2 is a sectional view on a greatly enlarged scale of our pyrolytic release taken along the line 2—2 of Figure 1.

More particularly, referring now to the drawings, Figure 1 shows a parachute canopy 10 to which a load 12 is secured by means of shroud lines 14 extending between the hem 16 of the canopy 10 and a ring 17 attached by a line 15 to a U-shaped fitting 18 secured to the load. A reefing band 20 encompasses the folds of the canopy a short distance above the hem 16 of the canopy. A suitable static line 19 is attached to the parachute bridle 21. Our pyrolytic release, indicated generally by the reference character 22, is secured between the ends of the reefing band 20 in a manner which will be described in detail hereinafter. A short length of line 28 is secured at one end to the triggering element 26 and has a loop 30 formed in its other end. One of the shroud lines 14 passes through the loop 30 and is snubbed thereby so as to be put under tension by the load 12 before the remaining lines 14. When the snubbed line 14 is so tensioned by the load, it releases the triggering element 26 to fire the release device in a manner which will be described in detail hereinafter.

Referring now to Figure 2, our release device 22 includes a cartridge holder or housing 32 provided with a longitudinal bore 34 in which we dispose a cartridge 36 containing a powder train 38. Cartridge 36 is formed at one end with an annular flange 40 adapted to seat on a shoulder 42 formed by the bore 34 and a threaded recess 44. A primer holder 46 is threaded into recess 44 to hold flange 40 of cartridge 36 against shoulder 42. Holder 46 is provided with a threaded bore 48 adapted to receive a threaded bushing 50 formed with a tapered bore 52 adapted to receive primer 54.

The charge 38 of cartridge 36 may be any suitable slow burning powder having a predetermined combustion rate depending upon the composition of the powder, the pressure with which it is packed, and the altitude at which the assembly is to be released. It will be appreciated that by changing cartridges we may provide various times of release delay. Some means must be provided which permits the escape of the gases generated during the combustion of charge 38 in order that gas pressure will not build up within the bore 34 which would increase the rate of combustion of the charge 38. In order to accomplish this end, we form the primer holder 46 with vents 58 through which the gases generated by the burning of the powder train may escape.

As can be seen by reference to Figure 2, the bore 34 is continued throughout the length of the cartridge holder 32 and is closed at the end remote from primer holder 46 by a threaded plug 60. Within the recess 62 formed by the continuation of bore 34 we dispose an auxiliary charge 64 of powder for ignition at the terminal burning of the charge 38 to ensure the fusing or burning of the securing means thus effecting the desired release action, as will be explained more fully hereinafter. An annular flange 65 on the end of the auxiliary charge cartridge is held by a plug 60 against a shoulder formed in the bore 34 to retain auxiliary charge 62 in position.

A transverse bore 66 extends across cartridge holder 32 and intersects the bore 34 between the charge 64 and the cartridge 36. We dispose a fusible or combustible link 68 formed of a length of suitable material such as nylon, low melting alloy, or the like within the bore 66 so that it extends through the space between charge 64 and cartridge 36.

One end of the bore 66 is enlarged to form a recess 70 adapted to receive an anchor plug 72. The fusible link 68 is threaded through an eye 76 formed on the end of plug 72. It is to be noted that plug 72 is formed with an annular boss 78 which seats on a sealing washer 80 disposed in recess 70. The end of bore 70 remote from recess 70 is enlarged to form a second recess 82 in which we dispose a tension plug 84. The ends of the link 68 pass through a pair of spaced bores 86 formed in plug 84 and are tied to form a knot 88 by means of which the link 68 is secured between the plugs 84 and 72. Plug 84 is carried by interior threads 92 in the recess of an acorn nut 90, the reduced end of which is positioned in recess 82. A set screw 94 is threaded within a bore 96 in cartridge holder 82 and has a spline 98 formed on its end. Plug 84 has a longitudinal groove 100 formed therein by means of which it rides along the spline 98. A sealing washer 102 is disposed at the bottom of recess 82 and the end of nut 90 is seated thereon. It will be appreciated that as nut 90 is rotated, plug 84 will be withdrawn from bore 66 and recess 82 or driven further thereinto. As plug 84 moves inwardly or outwardly, the tension on fusible or combustible link 68 will be decreased or increased. There will, however, be no twisting of link 68, since spline 98 prevents plug 84 from turning with nut 90. One end of the reefing band 20 is attached to a ring 104 secured to nut 90 and the other end of band 20 is similarly fixed to a ring 106 on anchor plug 72.

The end of cartridge holder 32 removed from plug 60 is formed with an axially extending, circumferential flange 108 provided with internal threads 110. The firing pin housing 112 is threaded within flange 108 on threads 110 to retain an expansible bellows 126, which may be made of synthetic resin, between the end of housing 112 and the end of cartridge holder 32. It will be appreciated that when housing 112 is threaded within flange 108, its end engages the periphery of the bellows 126 to seat it against the end face of cartridge holder 32 and clamp it firmly in position to provide an airtight seal.

A firing pin 114 having a shank 116 is disposed within the housing 112. The end of shank 116 remote from pin 114 has an enlarged portion 118 formed with a sear notch 120. An interior annular boss 122 forms a bore 124 in which enlarged portion 118 is normally disposed. Shank 116 is formed with a flange 136 adjacent the pin 114. A nut 130 screwed on threads 128 formed on the shank 116 between pin 114 and flange 136 clamps bellows 126 between the flange and a sealing washer 132 disposed between the nut 130 and the bellows. Washer 132 provides a seal around the shank 116 of pin 114, thus completing the sealing of the interior of the bellows.

The trigger 26 is formed with an end 140 having a trigger notch 142 which complements the enlarged portion 118 and sear notch 120. The length of line 28 is secured to trigger 26 at one end by a loop 144, and a loop 30 at the other end snubs a selected shroud line 14 passing therethrough. A cap 146 is threaded on the end of housing 112 formed by boss 122 and has an end bore 148 through which the looped line 28 extends. It is to be noted that tension on line 28 will not release firing pin 114 from trigger 26 until such time as the joint formed by sear and trigger portions 118 and 140 is withdrawn from bore 124. In order to ensure that no accidental release of the trigger takes place, we dispose a cotter pin 150 immediately below trigger 26. This pin 150 extends through respective openings 152 and 154 formed in cap 146. If an attempt is made to withdraw trigger 26 from bore 124, pin 150 prevents the withdrawal. When the device is to be used, pin 150 must be withdrawn from openings 152 and 154.

It will readily be appreciated that the expansible bellows 126 not only expands to prevent the build-up of pressure within the cartridge housing 32 but also permits the withdrawal of the trigger 26 to release the firing pin to initiate burning of the combustible element without destroying the hermetic seal. Bores 156 are formed in cartridge holder 32 to provide a means by which the release device may be conveniently secured to any assembly.

When it is desired to employ our delay opening parachute, pin 150 is first withdrawn from cap 146. The parachute is released from the plane and the canopy extended by static line 19. If no static line is employed, the canopy streams to extend the shroud lines, since it has a greater air resistance than load 12. It will be appreciated that the snubbed shroud line 14 will be tensioned before the remaining lines 14. The snubbed shroud line 14 tensions the line 28 sufficiently to withdraw trigger 26 and its portion 140 from the bore 124, thus releasing the joint formed by notches 120 and 142 and cocking the spring 134. The firing pin 114 is thus released to strike and ignite the primer 54. Primer 54 ignites the delay powder train 38 contained in cartridge 36. As the powder 38 burns, gases are generated which escape into the space enclosed by the expansible bellows 126 through vents 58. Bellows 126 expands as the powder burns. This expansion prevents the building up of such pressure within the housing 32 as would substantially increase the rate of burning of the powder train 38 and thereby shorten the predetermined delay time. After this material has burned for a predetermined time, depending upon its composition and the altitude at which burning takes place, auxiliary charge 64 will be ignited. The added heat ensures that fusible or combustible link 68 will melt or burn through positively to release reefing band 20. When this action takes place, plug 84 and nut 90 and plug 72 are freed from their respective recesses and reefing band 20 falls free of the canopy. The canopy then balloons and performs its normal function of governing the descent of the load 12 at a predetermined rate.

The time at which the canopy is released may be varied by substituting a cartridge 36 formed of powder 38 having a different composition. This will depend, of course, on the desired use. This substitution may readily be accomplished by unscrewing housing 112 from flange 108 and removing the primer holder 46. Similarly, we may replace the auxiliary charge 64 by removing plug 60.

The tension on the fusible or combustible link 68 may readily be adjusted by turning nut 90. Assuming that threads 92 are right-hand threads, if the nut 90 is turned in a clockwise direction, plug 84 will be withdrawn from bore 66 along spline 98 and the tension on fusible link 68 increased. This adjustment ensures a certain release of the reefing link 20 when the link 68 is severed.

The seal provided by bellows 126 ensures against deterioration of the charge 64 and powder 38. We are thus able to store our release device for a considerable length of time with the assurance that the predetermined release time will not be affected by deterioration of the combustible delay trains. The expansible bellows 126 provides a hermetic seal while preventing the building up of pressure within cartridge housing 32 which would affect the predetermined delay time. The bellows, moreover, permits the withdrawal of trigger 26 from bore 124 without destroying the hermetic seal.

It is to be understood that the bellows may be made of thin material which will rupture at a predetermined pressure in event the release action has not taken place before the bellows reaches its limit of expansion. In this manner we are always certain the powder train rate of combustion will not be unduly increased to shorten the delay time below the desired interval.

It will be seen that we have accomplished the objects of our invention. We have provided a delay opening parachute and pyrolytic release therefor wherein the combustible elements are hermetically sealed from the atmosphere to ensure against deterioration. Our hermetic seal permits the expansion of the gases of combustion without destroying the seal and thus prevents the building up of pressure under which the delay powder train burns. The seal also permits the actuation of the trigger without destroying the seal. Moreover, we have provided a pyrolytic release wherein the tension of the fusible element may readily be regulated. Our delay opening parachute release may be actuated by the shroud lines of the parachute or by a static line, if desired. We have provided means for locking the triggering member of our release to prevent accidental initiation of the cycle of operation.

It will be understood that certain features and subcombinations are of utility and may be employed without reference to other features and subcombinations. This is contemplated by and is within the scope of our claims. It is further obvious that various changes may be made in details within the scope of our claims without departing from the spirit of our invention. It will therefore be understood that our invention is not to be limited to the specific details shown and described.

Having thus described our invention, what we claim is:

1. A delay opening parachute comprising in combination a parachute having a canopy provided with a hem and shroud lines adapted to support a load, a reefing band having a pair of ends and encompassing the said canopy adjacent the hem thereof, a delay device including a powder train housing and a firing pin casing, said housing being formed with means permitting the escape of gases therefrom, a heat severable link disposed within said housing and connected between the ends of said reefing band, a powder train in said powder train housing having its end positioned adjacent said link, a firing pin disposed within said casing, means actuated by the parachute shroud lines to release said firing pin to ignite said powder train and a flexible seal between said housing and said casing, the construction and arrangement being such that said flexible seal prevents the buildup of pressure within said container during the burning of said combustible means.

2. A delay opening parachute as in claim 1 wherein said powder train includes a cartridge having a predetermined burning time and an auxiliary charge, said cartridge and said auxiliary charge being disposed on opposite sides of said heat severable link.

3. A delay opening parachute as in claim 1 including adjustable means for connecting said heat severable link between said reefing line ends.

4. A delay opening parachute as in claim 1 wherein said hermetic seal is an expansible bellows, said firing pin extending through said bellows and sealing means between the firing pin and bellows.

5. A release device for delay opening parachutes having means to be released after a predetermined delay time comprising in combination a cartridge container having a bore formed therein, a fusible link disposed within said container and extending across said bore, means provided at the respective ends of said link for attaching the link to the means to be relased thereby, combustible means carried within said container and adapted to sever said link a predetermined time after said combustible means is ignited, a housing secured to said container, releasable means disposed within said housing and adapted to ignite said combustible means upon its release, and a flexible hermetic seal disposed between said container and said housing.

6. A release device as in claim 5 including means for locking said releasable means.

7. A release device as in claim 5 including means for adjusting the tension on said fusible link.

8. A release device as in claim 5 wherein said container is provided with a pair of diametrically opposed recesses and said means provided at the respective ends of the link includes an anchor plug disposed in one of said recesses, an acorn nut within the other of said recesses, a tension plug adjustably carried by said acorn nut and a spline on which said tension plug is adapted to ride.

9. A release device as in claim 5 wherein said hermetic seal is an expansible bellows disposed between said container and said housing.

10. A release device as in claim 5 wherein said hermetic seal is an expansible bellows disposed between said container and said housing and said releasable means includes a firing pin, said firing pin extending through said bellows and a seal between said bellows and said pin.

References Cited in the file of this patent

UNITED STATES PATENTS

| | | |
|---|---|---|
| 1,843,597 | Coffman | Feb. 2, 1932 |
| 2,564,209 | Murphy | Aug. 14, 1951 |
| 2,582,113 | Finken | Jan. 8, 1952 |